(12) United States Patent
Zhang

(10) Patent No.: US 10,424,175 B2
(45) Date of Patent: Sep. 24, 2019

(54) MOTION DETECTION SYSTEM BASED ON USER FEEDBACK

(71) Applicant: SHANGHAI XIAOYI TECHNOLOGY CO., LTD., Shanghai (CN)

(72) Inventor: Junfeng Zhang, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 14/926,689

(22) Filed: Oct. 29, 2015

(65) Prior Publication Data

US 2017/0053504 A1 Feb. 23, 2017

(30) Foreign Application Priority Data

Aug. 21, 2015 (CN) .......................... 2015 1 0519232

(51) Int. Cl.
*G08B 19/00* (2006.01)
*G08B 13/196* (2006.01)
(Continued)

(52) U.S. Cl.
CPC ....... *G08B 13/19613* (2013.01); *G08B 29/20* (2013.01); *G06K 9/00771* (2013.01); *G08B 17/125* (2013.01)

(58) Field of Classification Search
CPC ........ G08B 13/19602; G08B 13/19645; G08B 13/19615; G08B 13/19693; G08B 13/19656; G08B 19/00; G06B 13/613; G06B 13/636; G06B 13/695; G06B 13/663; G06B 13/615; G06B 13/669; G06B 13/665; G06K 9/00771; G06K 9/62; G06K 9/6267; G06K 2009/00738; G06K 9/00362; G06K 9/00785; G06K 9/3241; G06K 9/6255; H04N 7/188

See application file for complete search history.

(56) References Cited

U.S. PATENT DOCUMENTS 7,382,244 B1 * 6/2008 Donovan ......... G08B 13/19645
340/506
2003/0095687 A1 * 5/2003 Montgomery ..... G06K 9/00362
382/103
(Continued)

FOREIGN PATENT DOCUMENTS

CN 102752574 A 10/2012
CN 203658764 U 6/2014

OTHER PUBLICATIONS

Bihn, Long Term Carefully Learnign for Person Detection Application to Intelligent Surveillance System, ACM, MoMM 2011, pp. 34-41, Dec. 5, 2011.*

*Primary Examiner* — Jingge Wu
(74) *Attorney, Agent, or Firm* — Cantor Colburn LLP

(57) ABSTRACT

A method, device, and system for video monitoring based on feedback provided by one or more users. The device includes a processor configured to acquire video data and analyze the video data, based on a set of rules, to determine whether to generate an alert indicating a motion event. The processor of the device is further configured to transmit the alert to a recipient f an alert is generated and to update the set of rules based on feedback or an action of the recipient in response to the alert.

18 Claims, 4 Drawing Sheets

(51) Int. Cl.
  *G08B 29/20* (2006.01)
  *G08B 17/12* (2006.01)
  *G06K 9/00* (2006.01)

(56) References Cited

U.S. PATENT DOCUMENTS

| | | | |
|---|---|---|---|
| 2004/0113770 A1* | 6/2004 | Falk | G08B 13/19645 340/531 |
| 2006/0001537 A1* | 1/2006 | Blake | G08B 13/19656 340/521 |
| 2006/0066722 A1* | 3/2006 | Yin | H04N 7/181 348/143 |
| 2006/0077254 A1* | 4/2006 | Shu | G08B 13/19608 348/143 |
| 2007/0182818 A1* | 8/2007 | Buehler | G08B 13/19602 348/143 |
| 2009/0060278 A1* | 3/2009 | Hassan-Shafique | G06K 9/00771 382/103 |
| 2010/0002082 A1* | 1/2010 | Buehler | G08B 13/19693 348/159 |
| 2011/0050897 A1* | 3/2011 | Cobb | G06K 9/00771 348/143 |
| 2011/0261202 A1* | 10/2011 | Goldstein | G08B 13/19602 348/149 |
| 2012/0019659 A1* | 1/2012 | Warzelhan | H04N 7/18 348/143 |
| 2012/0069131 A1* | 3/2012 | Abelow | G06Q 10/067 348/14.01 |
| 2013/0215266 A1* | 8/2013 | Trundle | G08B 13/19602 348/143 |
| 2014/0375800 A1* | 12/2014 | Lim | H04M 1/72538 348/143 |
| 2015/0098613 A1* | 4/2015 | Gagvani | G06T 7/254 382/103 |
| 2015/0269745 A1* | 9/2015 | Klimer | G08B 13/19602 382/103 |
| 2015/0286857 A1* | 10/2015 | Kim | G06F 17/30247 382/118 |
| 2016/0165187 A1* | 6/2016 | Rasheed | G06K 9/3241 348/143 |

* cited by examiner

MOTION DETECTION SYSTEM BASED ON USER FEEDBACK

CROSS-REFERENCE TO RELATED APPLICATION

This application is based upon and claims the benefit of priority from Chinese Patent Application No. 201510519232.2, filed on Aug. 21, 2015, the disclosure of which is expressly incorporated herein by reference to its entirety.

TECHNICAL FIELD

The present disclosure relates to monitoring an environment using a video camera and in particular relates to systems, apparatuses, and methods for detecting a motion event based on user feedback.

BACKGROUND

Video monitoring devices allow individuals and businesses to monitor premises for various purposes, including, e.g., security, baby or elderly monitoring, videoconference, or the like, or any combinations thereof. The motion-detection technology often employs video monitoring device to detect an instance of a motion event, for example a break-in. When a motion event is detected, the video monitoring device may automatically record videos and/or send an alert to a user (e.g., the premise owner) or a third-party (e.g., a police station or security firm).

A conventional video monitoring device detects a motion event based on algorithms or rules implemented in hardware or firmware during manufacturing. One problem is that the conventional video monitoring devices often falsely recognize a non motion event as a motion event or a legitimate motion event as an illegitimate one. Consequently, useless videos may be recorded and/or false alerts sent, incurring unnecessary costs. For example, a conventional video monitoring device may not be able to distinguish a pet from an intruder, and the motion of a pet in a house could be detected as an illegitimate motion event, and a false alert could be sent. Hardware implementation of the algorithms for motion detection and alert generation does not allow correction for such false alerts. On the other hand, even though manufacturers or vendors may update the detection algorithms implemented in firmware, updates generally take a long time and are slow to react to problems identified in actual use. Moreover, firmware implementation depends on CPU performance and therefore prohibits complex algorithms that require a large amount of computation.

Another problem with conventional motion detection devices is that, because users' needs and conditions of premises may differ, the algorithms may work for one user but not another. For example, when a vehicle passes a house, light from the vehicle may pass through the windows of the house, causing light-condition changes in the house. Such light-condition changes may be common in some areas, e.g., near busy streets, and are generally acceptable. But in remote areas, such light-condition changes may indicate an unauthorized intrusion and should be reported to the owner. In another example, a user may have a different time window than other uses during which the user does not wish to detect motion or receive an alert for a detected motion event. The convention motion device using a common algorithm may generate and send unwanted alerts to the user during that particular time window. Firmware updates in the conventional motion detection devices do not solve such problem.

SUMMARY

Consistent with embodiments of this disclosure, there is provided a method of video monitoring. The method includes acquiring video data; analyzing the video data, based on a set of rules, to determine whether to generate an alert indicating a motion event; transmitting the alert to a first recipient if an alert is generated; and updating the set of rules based on feedback or an action of the first recipient in response to the alert.

Consistent with embodiments of this disclosure, there is further provided a device or system for video monitoring. The device or system includes a processor and a memory storing programming for execution by the processor. The processor is configured for the device or system to acquire video data; analyze the video data, based on a set of rules, to determine whether to generate an alert indicating a motion event; transmit the alert to a first recipient if an alert is generated; and update the set of rues based on feedback or an action of the first recipient in response to the alert.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

DESCRIPTION OF DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
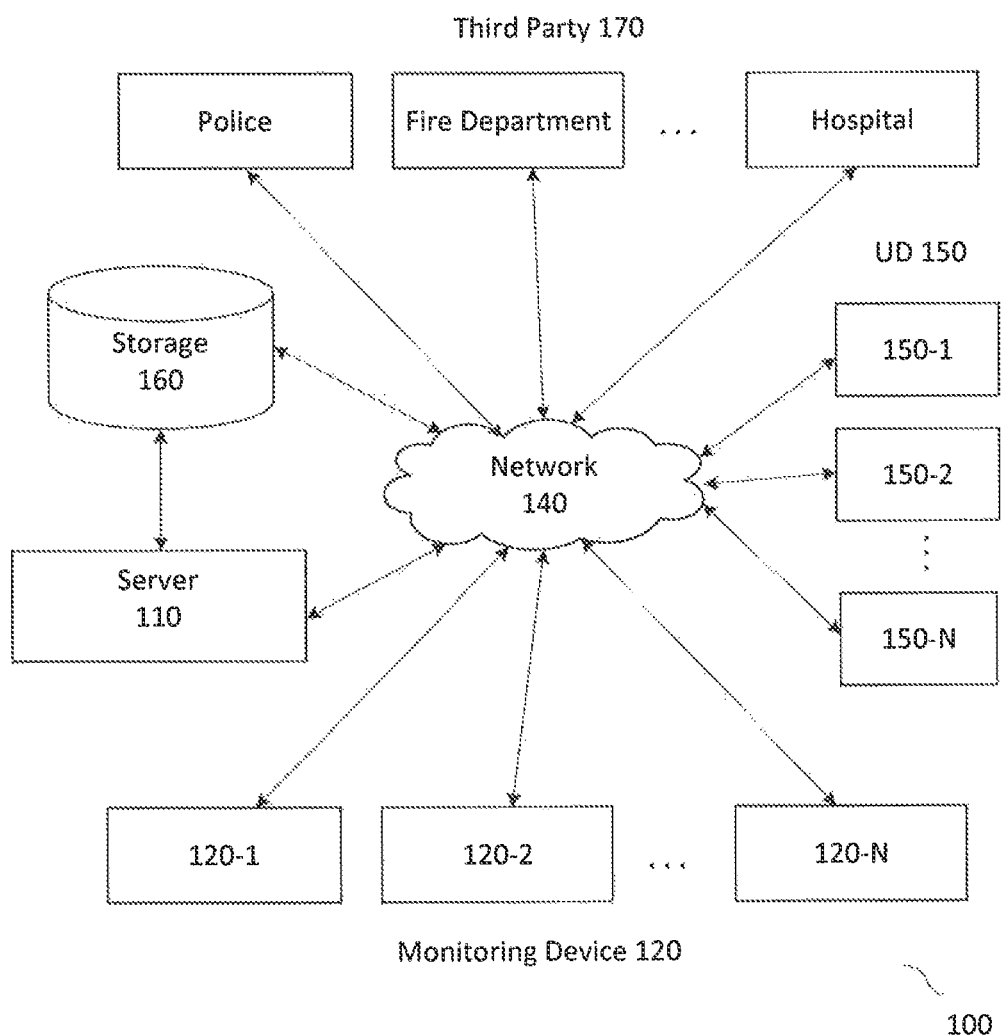
FIG. 1 is a block diagram of an exemplary system consistent with embodiments of the present invention.

Reference will now be made in detail to the disclosed embodiments, examples of which are illustrated in the accompanying drawings. Wherever convenient, the same reference numbers will be used throughout the drawings to refer to the same or like parts.

These and other objects, features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be understood, however, that the drawing(s) are for the purpose of illustration and description only and are not intended as a definition of the limits of the invention. As used in the specification and in the claims, the singular form of "a", "an", and "the" include plural referents unless the context clearly dictates otherwise.

Embodiments of the present application include methods, systems, and articles that address needs not met by conventional devices. A monitoring device may capture data of an environment such as still images and videos. The captured data is analyzed to determine if a motion event has occurred and, if so, whether an alert should be sent to a user, a service engine (i.e., a server), and/or third parties (such as police station, fire station, security firms, hospital).

Consistent with the present disclosure, algorithms for determining if a motion event has occurred or if an alert should be sent for the motion event may be updated based on feedback or an action from the user, service engine, or third parties in response to the alert. For example, the user may indicate that the detected motion is of the user's pet and the alert is thus a "false" alarm. Accordingly, the algorithms for motion detection and generation of alert may be updated to not identify a pet's motion as a motion event, or to not generate an alert for the pet's motion event. Alternatively, the algorithms for motion detection and alert generation may be updated for a particular user based on feedback from or actions taken by a group or community of similarly situated users, or users whose feedback could be applicable to the situation of the particular user.

A system consistent with the present disclosure may include monitoring devices and servers communicating with one another over a network. The algorithms for motion detection and alert generation may be implemented in software/firmware entirely on the monitoring device, or partly on the monitoring device and partly on one or more servers. Even though one skilled in the art should appreciate "software" to be different from "firmware," any difference would not affect embodiments of the present invention. Therefore, the descriptions below do not distinguish the two terms from each other, and either term may refer to the other or both.

Consistent with the present disclosure, the software implementation of the algorithms receives user feedback and allows automatic updates based on the feedback. Accordingly, updates to the software or firmware consistent with the present disclosure do not require intervention by the manufacturer or vendor, download of updated software from the manufacturer's or vendor's server or webpage, and installation on the monitoring device of the updated software.

In one aspect, the software defines environment parameters used in the algorithms, such as the presence of a pet or an authorized person at the premise, the time window during which the user does not wish to detect motion or generate an alert for the detected motion (e.g., light-condition changes caused by passing vehicles when passing vehicles are not expected), etc. Based on user feedback, the parameters are modified or updated in the monitoring device and/or the server(s). Alternatively, the software may define as parameters switches corresponding to different algorithms or computation models for different environmental situations (e.g., a pet vs. an intruder) differently. As such, updates may be realized when user feedback triggers or activates a switch for a different algorithm in the system. A further alternative is that the system may include a software manager (for example, residing in a server of the system) that generates an updated software package or a software patch based on the feedback and pushes the package or patch to the monitoring device and/or servers, depending on where the software/firmware resides, for updating.

Exemplary, non-limiting, embodiments will be described below in connection with the figures.

FIG. 1 is a block diagram of an exemplary system 100 for monitoring an environment. System 100 may include one or more monitoring devices 120 (120-1, 120-2, ..., 120-N), one or more servers 110, one or more user devices 150 (user device 150-1, 150-2, ..., 150-N), and a storage 160. The components of system 100 may communicate via network 140. The components of system 100 may also communicate via network 140 with one or more third parties 170, such as police stations, fire departments, security firms, hospitals.

A monitoring device 120 may include, for example, a digital camera, a web camera, a smartphone, a tablet, a laptop, a video gaming console equipped with a web camera, etc. A user device 150 may include a smartphone, a tablet, a laptop, a desktop, a server, or the like. Storage 160 may include any of network attached storage (NAS), cloud storage service (CSS), or other similar storage medium. Storage 160 may be separate from servers 110 or be part of a server 110. Network 140 may comprise any network or communication connection known to those skilled in the art. For example, network 140 may be part of the Internet, or may comprise an intranet network, a local area network, or other wireless or hardwired connection or connections (e.g., Bluetooth, WiFi, cellular data networks).

In operation, monitoring device 120 may capture images or video data of an environment, such as a home, hospital, or school, and transmit the captured or acquired image and/or video data to server 110 user device 150, or storage 160 via network 140. The acquired images or video data are analyzed to determine whether to an alert (or notification) should be generated and sent to user device 150 or a third party device third party 170.

The analysis of the captured image or video data may be performed on monitoring device 120 or by the server 110, or both. If the analysis is at least partly performed by server 110, then monitoring device 120 may send the data directly to server 110 or to storage 160, and in the latter situation server 110 may extract the data from storage 160.

If generated, an alert indicating a motion event may be sent to user device 150 and/or a third party 170. Monitoring device 120 may generate the alert and send the alert to user device 150 and/or third party 170, or send the alert to server 110, which may forward the alert to user device 150 and/or third party 170.

In response to an alert, the user of user device 150 may decide what action. The user may ignore the alert, may forward the alert to another device or a third party, or may retrieve the corresponding images and/or video data from monitoring device 120, server 110, or storage 160, or any other part of system 100 that might store the relevant images or video. The user may also provide additional feedback in response to the alert indicating a false alert or a preference. For example, as mentioned above, the detected motion event may be that of a pet, and should not be reported as illegitimate and alerted. The user may have a preference for a time window of the day during which alerts should be generated. For example, the user may prefer for motion detection or alert generation to be disabled at night, when family members may be moving around in the house. Likewise, a third party 170 may respond to the alert in various ways and may also provide certain feedback. The response and/or feedback may be sent to monitoring device 120, server 110, or other components (shown or not shown in FIG. 1) of system 100 for further processing.

The algorithms for determining if a motion event has occurred and/or if an alert should be generated may be implemented as software or firmware and may reside in monitoring device 120, one or more servers 110, or both. Feedback from the user(s) and/or third parties is used to update the software or firmware.

In one aspect, the software/firmware receives feedback from users or third parties in response to alerts and updates itself accordingly. Alternatively, system 100 includes a software manager (for example, residing in server 110) that receives the feedback and updates the software/firmware for motion detection and alert generation.

In one aspect, the software defines environment parameters used in the algorithms, such as the presence of a pet or an authorized person at the premise, the time window during which the user does not wish to detect motion or generate an alert for the detected motion (light-condition changes caused by passing vehicles when passing vehicles are not expected), etc. Based on user feedback, the parameters are modified or updated in the monitoring device and/or the server(s). Alternatively, the software may define as parameters switches corresponding to different algorithms or computation models for different environmental situations (e.g., a pet vs. an intruder) differently. As such, updates may be realized when user feedback triggers or activates a switch for a different algorithm in the system. A further alternative is that system 100 may include a software manager (for example, residing in server 110 of system 100) that generates an updated software package or a software patch based on the feedback and pushes the package or patch to the monitoring device and/or servers, depending on where the software/firmware resides, for updating.

Figure 2:
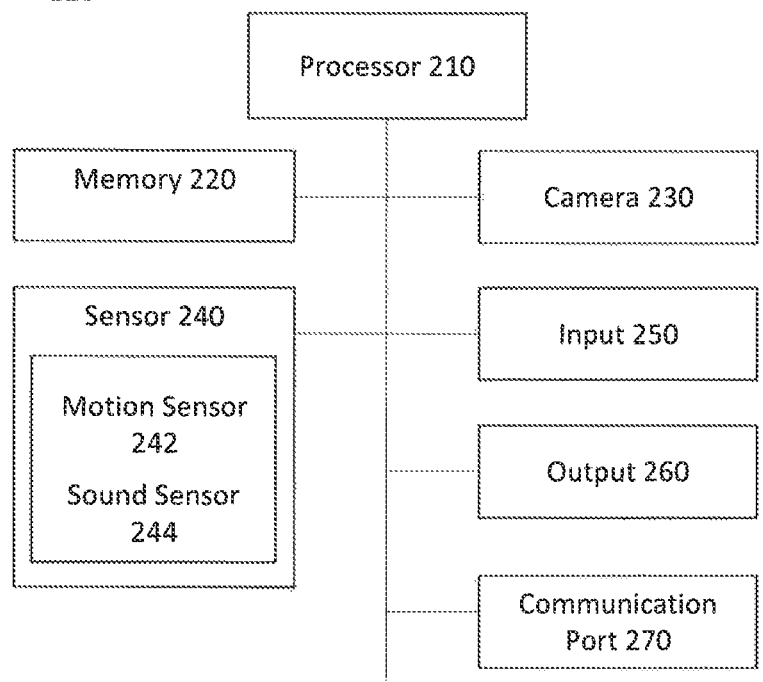
FIG. 2 is a block diagram of an exemplary monitoring device consistent with embodiments of the present invention.
Figure 3:
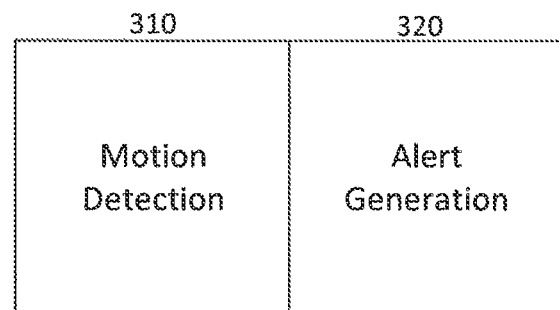
FIG. 3 is a block diagram of an exemplary software architecture 300 consistent with embodiments of the present invention.

FIG. 2 is a block diagram of an exemplary monitoring device 120 consistent with embodiments of the present application. Monitoring device 120 may include a processor 210, a memory 220, a camera 230, one or more sensors 240, an input 250, an output 260, and a communication port 270. Monitoring device 120 may also include one or more lights (not shown) for illuminating an area for capturing images, recording videos, or for other purposes.

Processor 210 may comprise a microprocessor. Memory 220 includes electronic memories such as random access memory (RAM), read-only memory (ROM), flash memory, non-volatile memory card. Camera 230 may comprise a digital camera, a web camera, or the like. Camera 230 may be embedded in monitoring device 120 along with other components thereof. Alternatively, camera 230 may be separate from, but connect to and communicate with, other components of monitoring device 120 through a wired or wireless connection. Sensor 240 may comprise a motion sensor, a sound sensor.

Input 250 may be a device that allows user input, such as a keyboard, a mouse, a voice input, a voice recognition unit, an eye tracking input, etc. Output 260 may comprise a display, a speaker, or else, that provides various types of output to facilitate communication between the user and monitoring device 120. In one aspect, input 250 may be a touchscreen used in conjunction with output 260 to receive user input as touches on the touchscreen, in the form of an on-screen cursor, keys, buttons, etc. Communication port 270 communicates with other components of system 100 via network 140 through wired or wireless connections, as discussed above.

Memory 220 may store programs, such as an operating system, and one or more software applications. For example, memory 220 may store software applications that, when executed, control operations of components of monitoring device 120, determine if a motion event has occurred, determine whether an alert should be generated and/or sent, encode images or video data, analyze the data, and/or transmit the data to other components of system 100. The software applications may be pre-loaded in memory 220 during manufacturing of monitoring device 120. Alternatively or additionally, the software applications may be downloaded and installed or updated at a later time after manufacturing. Memory 220 may also store data, including, for example, videos, still images, user information, schedules, training data, environmental data.

In operation, camera 230 captures still images or videos. Camera 230 may capture images or videos continuously, but memory 220 retains only most recent and current images or videos, unless otherwise instructed by processor 210, for example, when a motion event has been detected. Processor 210 executes software programs or applications to perform certain functions. For instance, processor 210 may analyze the data by captured camera 230 and determine whether a potential motion event has occurred. Processor 210 may also determine whether to generate a notification (or an alert). Processor 210 may further direct transmission of data, e.g., image and/or video data, to server 110, storage 160, and/or user device 150 via communication port 270.

Consistent with embodiments of the present disclosure, when a potential motion event is determined to have occurred, processor 210 may cause the corresponding images and/or videos captured by camera 230 to be stored in memory 220. Monitoring device 120 may record and save videos captured by camera 230 incrementally by a certain period of time, for example, by 1-minute increments. For example, monitoring device 120 may save a video starting from a period of time before the detected motion event and continue for one minute. If the motion event does not end at the end of the one-minute period, monitoring device 120 continues to record the video for another full minute.

In the situation where a motion event has been detected and the relevant video is to be transmitted to server 110 or storage 160, monitoring device 120 may transmit relevant video that contains the entirety of the motion event. A motion event is considered a single motion event if it contains gaps of no longer than a certain period of time, for example, 30 seconds. In other words, if monitoring device 120 detects movement, followed by a lack of movement for more than 30 seconds before movement resumes, monitoring device 120 will recognize the sequence of events as two motion events, and that the first motion event ended when lack of movement lasted more than 30 seconds. Without limitation, software architecture 300 may encompass software components residing on monitoring device 120, server 110, and/or storage 160. In one aspect, server 110 may comprise one or more servers and the various functions of software architecture 300 may be distributed across the servers. For example, one server may implement algorithms for determining if a motion event has occurred, while another server determines whether an alert should be generated.

In one aspect, motion detection module 310 may reside partly on monitoring device 120 and partly on server 110, while alert generation module 320 resides on server 110. This configuration is beneficial if monitoring device 120 has limited computation power. In such case motion detection module 310 may be configured to perform a two-step process, where monitoring device 120 performs a coarse determination of whether a motion event has occurred and, if so, server 110 carries out the second step of motion detection module 310 to provide a final determination. Because server 110 generally has much more powerful processor(s), much more complex computation, hence many more factors, may be considered in the second step, resulting in a much more accurate determination.

If, however, monitoring device 120 has sufficient computation power, then motion detection module 310, or even both motion detection module 310 and alert generation module 320, potentially can reside entirely within monitoring device 120.

Consistent with embodiments of the present invention, motion detection module 310 and alert generation module 320 both can be updated based on user feedback, as explained below in connection with FIGS. 4 and 5.

Figure 4:
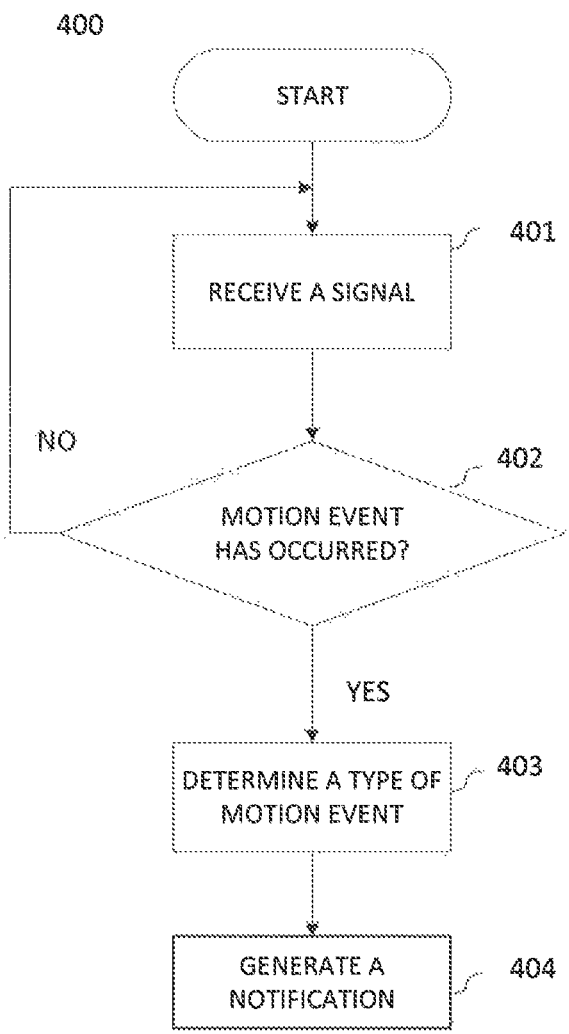
FIG. 4 is a flowchart of an exemplary motion detection process consistent with embodiments of the present invention.

FIG. 4 is a flowchart of an exemplary motion detection process 400 implemented in motion detection module 310. At step 401, motion detection module 310 may receive data relating to a potential motion event, such as still image data and/or video data captured by camera 230 and/or sensor 240. At step 402, a determination is made as to whether a motion event has occurred. Factors considered in step 402 may include the time periods during which the user does not wish to detect motion, light conditions during day and night at the premise, the portion(s) of the view of camera 230 where a moving object is likely to appear (e.g., the areas near the front door or windows, light-condition changes caused by passing vehicles when passing vehicles are not expected etc. The determination at step 402 may perform common motion detection methods, such as comparison of a plurality of images or frames of a video to identify possible movements of objects based on the differences in pixels in the images or frames. Related U.S. patent application Ser. No. 14/828,733, entitled "A Method of Low-Complexity Motion Detection Based on Frame Edges," filed on Aug. 18, 2015, by Lili Zhao, describes another exemplary method of motion detection that may be implemented in motion detection module 310. The entire disclosure of that related application is incorporated herein by reference.

At step 403, motion detection module 310 may optionally determine the type of motion event (involving a person, a pet, break-in, fire incident, etc.) and at step 404, generate a notification. Motion detection module 310 may also determine at step 403 other properties of the motion event, such as whether it was the homeowner, an authorized person, or a pet, that made the movement. If so, motion detection module 310 may choose not to generate a notification at step 404. Furthermore, motion detection module 310 may not generate a notification if such movement occurred within a particular time window. For example, a monitoring device installed inside a house may choose not to detect motions and/or generate notifications at night, when family members may be moving around in the house. A monitoring device located outside the house on the front door or in the backyard may or on a playground at a school may choose not to detect motions and/or generate notifications during a time period where children may be playing or other movements are normally expected.

Figure 5:
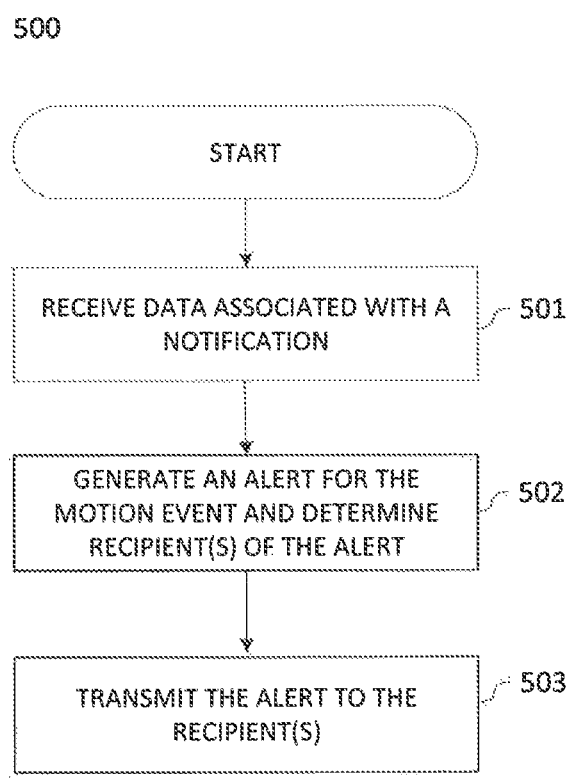
FIG. 5 is a flowchart of an exemplary alert generation process consistent with embodiments of the present invention.

FIG. 5 is a flowchart of an exemplary alert generation process 500 implemented in alert generation module 320. At step 501, alert generation module 320 receives a notification indicating a detected motion event, which may be generated by motion detection module 310. At step 502, alert generation module 320 may generate an alert for the motion event and determine one or more recipients of the alert. The alert may include the still images and/or video associated with the motion event, information relating to the motion event (e.g., the time and location of the motion event and/or the type(s) of the motion event), and information relating to monitoring device 120 that detected the motion event. The alert may also include information relating to the location where the still images and/or video are stored so the user or third party may access and download the images and/or video. Alert generation module 320 may determine that the alert should be transmitted to user device 150 (e.g., a cell phone, a laptop, etc.) or one or more third parties 170 (e.g., a police station, a hospital, etc.). Alert generation module 320 may also determine the recipients of the alert based on the type(s) associated with the detected motion event. For instance, an alert should be transmitted to a police station or security company, as well as the owner of the premise, for a break-in type motion event, and an alert should be sent to a fire station for a fire incident. At step 504, alert generation module 320 may transmit the generated alert to the determined recipients. After receiving an alert from monitoring device 120 or server 110, a recipient may respond to the alert. The recipient may request or access the images and/or video data associated with the alert. The recipient may download (or watch a stream of) the images and/or video data from storage 160 or server 110. The recipient may forward the alert or information relating to the alert to another party. For example, if the recipient receives the alert indicating a medical emergency, and the recipient may forward the alert to a hospital.

System 100 may be configured to receive user feedback in response to an alert. The feedback may include an indication of whether the alert was incorrect, inaccurate, or correct. The feedback may also comprise the recipient's indication of the type of the motion event, e.g., a break-in, fire incident, or medical emergency. The recipient(s) may send the feedback to server 110. System 100 may optionally be configured to generate a feedback inquiry based on information relating to the recipient(s) and send the alert to the recipient(s) likely to provide feedback. For example, a feedback inquiry may be generated based geographic information relating to the recipient(s), including, for example, where the recipient(s) and/or the monitoring device 120 are located, the gender information of the recipient(s), or the like. The feedback inquiry may be also generated based on how likely recipient(s) will respond to the alert. A recipient who has in the past provided feedback in, for example, over 70% of instances may be considered as highly likely to provide feedback.

System 100 may be configured to update the software modules discussed above for motion detection and alert generation based on feedback received from one or more parties (e.g., users, third parties, etc.) or training data.

In one aspect, server 110 (or one of the servers) analyzes user feedback and update the software modules accordingly, whether a particular part of the software modules resides on monitoring device 120 or on a server. Alternatively, the device or server where a portion of the software modules resides may be configured to receive user feedback and automatically update the relevant portion on its own.

As mentioned above, system 100 may be configured to evaluate feedback from a user for the purposes of updating the software modules for that user, i.e., on that user's monitoring device 120 or the software module on a server that handles the user's needs.

Alternatively or in addition, system 100 may be configured to factor in feedback from multiple or a community of users collectively for the purposes of updating the software modules for an individual user or for all users. For example, system 100 may consider feedback from users within a defined geographic area (e.g., a county or a neighborhood). Analysis may be performed on the feedback from multiple users to identify patterns and optimize the algorithms for motion detection and/or alert generation. In this respect, system 100 may be configured with a cloud computing architecture, such that users could all contribute to the improvement of the overall effectiveness of the system.

Further alternatively, system 100 may be configured to receive training data and configure or update the software modules for motion detection and alert generation based on the training data. Training data may include historical data of the motion events detected within an area, for example, data and/or actual videos or images relating to breaks-in in a county in the past twelve months. Training data may also include images and/or videos of past intruders, pets, and authorized persons.

In one aspect, the software modules detect motions or generate alerts based on environment parameters, such as the time window during which the user does not wish to detect motion or generate an alert for any detected motion, or the presence of a pet or authorized person at the premise. The parameters may be modified or updated in response to feedback. For example, the user may indicate, in response to an alert, that the moving object is the user's pet. System 100 may then update the algorithm so that the monitoring devices and/or servers do not treat an event in which the pet is the only moving object as a motion event, and/or not generate an alert for such event.

Alternatively, the software modules may have embedded therein different, alternative, algorithms or computation models for different environmental solutions (e.g., a pet vs. an intruder). In response user feedback, a particular algorithm might be triggered or selected.

Further alternatively, server 110 (or one of the servers) may generate a new version or a patch of a software module based on user feedback to push the new version or patch out to replace or supplement the existing version.

Server 110 may also be configured to register, add, and/or associate one or more monitoring devices 120 with a user account. For example, server 110 may receive a request from monitoring device 120 for registration. The request from the monitoring device 120 may include identification information of monitoring device 120. For instance, the identification information may include a media access control address (MAC address), a serial number, a unique ID information representing the monitoring device 120, or the like. Server 110 may add or associate the monitoring device 120 to the user account based on the request received. Server 110 may also generate the credential information to monitoring device 120 for uploading image and/or video data to storage 160 (and/or server 110). The credential information may include a web address (e.g., an intranet address, an IP address, an internet address) of the destination for uploading data (e.g., one or more storages 160 or server 110), an account name, a password, or the like, or any combinations thereof.

A user may log on to his account via, e.g., a web page on server 110, and access user information and information relating to associated monitoring device(s) 120. The user may also modify the information. For example, the user may modify the credential information for uploading image and/or video data by monitoring device 120. The user may also label monitoring device 120 based on its locations. For instance, the user may label a monitoring device 120 located at the front door as "FRONT DOOR" and another monitoring device 120 located at the backyard as "BACKYARD."

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for video monitoring, comprising:
receiving video data from one of a plurality of monitoring devices;
analyzing the video data and, based on a set of rules, selectively generating an alert indicating a motion event;
transmitting the alert to a corresponding user device of a first user if an alert is generated;
receiving, from the user device, a signal indicating an action of the first user in response to the alert;
receiving, from user devices of a plurality of users other than the first user, at least one signal indicating an action of the plurality of users in response to the alert, the plurality of users belonging to a community within a designated geographic area where the first user is situated;
identifying, based on the received signals indicating actions of the first user and the plurality of users in response to the alert, a feedback pattern in response to the alert; and
updating, based on the identified feedback pattern, alert generation rules associated with the first user.

2. The method of claim 1, wherein:
analyzing the video data comprises analyzing the video data at a server, and
updating the alert generation rules comprises updating the alert generation rules at the server.

3. The method of claim 1, wherein:
analyzing the video data comprises analyzing the video data at the one of the monitoring devices, and
updating the alert generation rules comprises updating the alert generation rules at the one of the monitoring devices.

4. The method of claim 1, wherein the signal indicating an action of the first user comprises an indication of the accuracy of the alert.

5. The method of claim 1, wherein the signal indicating an action of the first user comprises an indication of a category of the motion event.

6. The method of claim 1, further comprising transmitting the alert to the user devices of the plurality of users.

7. The method of claim 1, further comprising:
receiving training data; and
updating the alert generation rules based on the training data.

8. A device for video monitoring, comprising:
a memory storing instructions; and
a processor configured to execute the instructions to:
acquire video data;

analyze the video data and, based on a set of rules, selectively generate an alert indicating a motion event;

transmit the alert to a corresponding user device of a first user if an alert is generated;

receive, from the user device, a signal indicating an action of the first user in response to the alert;

receive, from user devices of a plurality of users other than the first user, at least one signal indicating an action of the plurality of users in response to the alert, the plurality of users belonging to a community within a designated geographic area where the first user is situated;

identify, based on the received signals indicating actions of the first user and the plurality of users in response to the alert, a feedback pattern in response to the alert; and update, based on the identified feedback pattern, alert generation rules associated with the first user.

9. The device of claim 8, wherein the signal indicating an action of the first user comprises an indication of the accuracy of the alert.

10. The device of claim 8, wherein the signal indicating an action of the first user comprises information indicating a category of the motion event.

11. The device of claim 8, wherein the processor is further configured to execute the instructions to:
transmit the alert to the user devices of the plurality of users.

12. The device of claim 8, wherein the processor is further configured to execute the instructions to:
receive training data; and
update the alert generation rules based on the training data.

13. A system for video monitoring, comprising:
a memory storing instructions; and
a processor configured to execute the instructions to:
receive a notification indicating a potential motion event from one of a plurality of monitoring devices;
acquire, based on the notification, video data associated with the potential motion event;
analyze the video data and, based on a set of rules, selectively generate an alert indicating a motion event;
transmit the alert to a corresponding user device of a first user if an alert is generated;
receive, from the user device, a signal indicating an action of the first user in response to the alert;
receive, from user devices of a plurality of users other than the first user, at least one signal indicating an action of the plurality of users in response to the alert, the plurality of users belonging to a community within a designated geographic area where the first user is situated;
identify, based on the received signals indicating actions of the first user and the plurality of users in response to the alert, a feedback pattern in response to the alert; and
update, based on the identified feedback pattern, alert generation rules associated with the first user.

14. The system of claim 13, wherein the signal indicating an action of the first user comprises an indication of the accuracy of the alert.

15. The system of claim 13, wherein the signal indicating an action of the first user comprises information indicating a category of the motion event.

16. The system of claim 13, wherein the processor is further configured to execute the instructions to:
transmit the alert to the user devices of the plurality of users.

17. The system of claim 13, wherein the processor is further configured to execute the instructions to:
receive training data; and
update the alert generation rules based on the training data.

18. A non-transitory computer-readable storage medium storing instructions that, when executed by at least one processor, cause the at least one processor to perform a method for video monitoring, the method comprising:
receiving video data from one of a plurality of monitoring devices;
analyzing the video data and, based on a set of rules, selectively generating an alert indicating a motion event;
transmitting the alert to a corresponding user device of a first user if an alert is generated;
receiving, from the user device, a signal indicating an action of the first user in response to the alert;
receiving, from user devices of a plurality of users other than the first user, at least one signal indicating an action of the plurality of users in response to the alert, the plurality of users belonging to a community within a designated geographic area where the first user is situated;
identifying, based on the received signals indicating actions of the first user and the plurality of users in response to the alert, a feedback pattern in response to the alert; and
updating, based on the identified feedback pattern, alert generation rules associated with the first user.

* * * * *